(12) United States Patent
Chen et al.

(10) Patent No.: US 10,481,576 B2
(45) Date of Patent: Nov. 19, 2019

(54) METHOD AND DEVICE FOR IMPLEMENTING CONNECTION CONTROL

(71) Applicant: ZTE CORPORATION, Guangdong (CN)

(72) Inventors: Tao Chen, Guangdong (CN); Chao Liang, Guangdong (CN); Jiancheng Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 60 days.

(21) Appl. No.: 15/570,069

(22) PCT Filed: Jun. 1, 2015

(86) PCT No.: PCT/CN2015/080503
§ 371 (c)(1),
(2) Date: Oct. 27, 2017

(87) PCT Pub. No.: WO2016/173081
PCT Pub. Date: Nov. 3, 2016

(65) Prior Publication Data
US 2018/0307195 A1    Oct. 25, 2018

(30) Foreign Application Priority Data

Apr. 30, 2015 (CN) .......................... 2015 1 0216881

(51) Int. Cl.
*H02J 7/00* (2006.01)
*H02J 7/02* (2016.01)
*G05B 19/10* (2006.01)

(52) U.S. Cl.
CPC ............ *G05B 19/10* (2013.01); *H02J 7/0052* (2013.01); *H02J 7/025* (2013.01); *G05B 2219/2639* (2013.01); *H02J 2007/0062* (2013.01)

(58) Field of Classification Search
CPC ......................................................... H02J 7/00
USPC ......................................................... 320/108
See application file for complete search history.

(56) References Cited

U.S. PATENT DOCUMENTS

2010/0293302 A1    11/2010  Fujii et al.
2014/0285006 A1*    9/2014  Xu ............................ G06F 1/26
                                                       307/23

FOREIGN PATENT DOCUMENTS

| CN | 102222942 A | 10/2011 |
| CN | 102593883 A | 7/2012 |
| CN | 203387203 U | 1/2014 |
| CN | 204167970 U | 2/2015 |
| EP | 2 472 353 A1 | 7/2012 |

OTHER PUBLICATIONS

European Extended Supplementary Search Report dated Mar. 29, 2018 received in European Patent Application No. 15 89 0460.7.
International Search Report dated Feb. 3, 2016 issued in PCT/CN2015/080503.

* cited by examiner

*Primary Examiner* — Suresh Memula
(74) *Attorney, Agent, or Firm* — Cantor Colburn LLP

(57) ABSTRACT

A method for implementing connection control includes: reading connection parameter information from a charging manager, and determining, according to the connection parameter information, a connection state of electric equipment; and controlling, according to the connection state of the electric equipment, ON or OFF of a circuit and/or an enabled state of the circuit.

8 Claims, 2 Drawing Sheets

100

Read connection parameter information from a charging manager, and determine, according to the connection parameter information, a connection state of electric equipment

101

Control, according to the connection state of the electric equipment, ON or OFF of a circuit and/or an enabled state of the circuit

US 10,481,576 B2

METHOD AND DEVICE FOR IMPLEMENTING CONNECTION CONTROL

CROSS REFERENCE

This application is the 371 application of PCT Application No. PCT/CN2015/080503 filed Jun. 1, 2015, which is based upon and claims priority to Chinese Patent Application No. 201510216881.5, filed on Apr. 30, 2015, the entire contents thereof are incorporated herein by reference.

TECHNICAL FIELD

The present disclosure relates to electronic control technologies, and more particularly, to a method and device for implementing connection control.

BACKGROUND

As mobile terminal charging technologies are in the continuous development, charging needs become increasingly simple, fast and diversified. Consequently, wireless charging technologies are generated on demand. Also known as inductive charging, wireless charging stems from the wireless power transmission technologies, in which energy is transmitted by power supply equipment (chargers) to electric devices by means of inductive coupling to charge batteries. Energy transmission between the power supply equipment and the electric devices can be implemented through inductive coupling. Therefore, the power supply equipment and the electric devices may implement nonconductive contact point exposure without wired connection.

During wireless charging, receivers of the electric devices are charged by converting AC signal to 5V DC signal. Unlike standard chargers (wired chargers), the output signal is only a power line and a ground wire. Charging managers of most of electric devices in the market regard, by default, chargers only provided with power lines and ground wires as a computer connection entry USB mode. In this mode, charging current less than or equal to 500 mA (such as 450 mA) can be supplied. Counting system consumption in, current actually available for battery charging is only about 400 mA, which leads to a slow charging process. Therefore, the above mode is slow in charging and unable to meet charging demands of users, which affects the application of the wireless charging technologies.

To improve the wireless charging efficiency, most of electric devices having wireless charging functions are provided with different charging managers for wired charging and wireless charging, which increases costs of the electric devices and layouts of printed circuit boards (PCBs). If one charging manager is used, the wireless charging is configured as AC charging since the charge manager has completed the enumeration of charge types. Thus, when a computer or OTG equipment is connected during wireless charging, it is impossible to recognize the computer or OTG equipment. If the wireless charging is interrupted, after the USB connection is disconnected or the OTG equipment is removed, it is impossible to recover the wireless charging because the wireless charging communication is disconnected. That is, because of cutoff of wireless charging, the charging manager performs enumeration of charge types. Therefore, it is still impossible to recognize disconnection of the USB connection or removal of the OTG equipment.

In summary, the method of using two charging managers has a great impact on the electric devices in cost and PCB layout, which is to the disadvantage of application of the electric devices. However, if the method of using one charging manager is adopted, it is impossible to recognize connection of a computer or OTG equipment after completing enumeration of wireless charging, and it is impossible to recognize disconnection of the USB connection or removal of the OTG equipment after completing enumeration of connection of the computer or OTG equipment. Therefore, the method of using one charging manager is also unavailable for wireless charging.

This section provides background information related to the present disclosure which is not necessarily prior art.

SUMMARY

Embodiments of the present disclosure provide a method and device for implementing connection control, which can recognize a connection state of an electric terminal, thereby correctly performing corresponding connection control.

An embodiment of the present disclosure provides a method for implementing connection control, including:

reading connection parameter information from a charging manager, and determining, according to the connection parameter information, a connection state of electric equipment; and controlling, according to the connection state of the electric equipment, ON or OFF of a circuit and/or an enabled state of the circuit.

An embodiment of the present disclosure also provides a device for implementing connection control, which includes a determining unit and a switching unit.

The determining unit is configured to read connection parameter information from a charging manager, and determine, according to the connection parameter information, a connection state of electric equipment.

The switching unit is configured to control, according to the connection state of the electric equipment, ON or OFF of a circuit and/or an enabled state of the circuit.

An embodiment of the present disclosure further provides a computer readable storage medium, which stores program instructions. When the program instructions are executed, the above method may be implemented.

Compared with related technologies, the technical solution of the embodiment of the present disclosure includes: reading connection parameter information from a charging manager, and determining, according to the connection parameter information, a connection state of electric equipment; and controlling, according to the connection state of the electric equipment, ON or OFF of a circuit and/or an enabled state of the circuit. The connection state of the electric equipment is determined according to the connection parameter information, thereby implementing the connection control. In this way, connection management of the electric equipment merely applicable to one charging manager is implemented, thereby reducing cost and guaranteeing the switching control of wireless charging or connection of the electric equipment when the connection changes.

This section provides a summary of various implementations or examples of the technology described in the disclosure, and is not a comprehensive disclosure of the full scope or all features of the disclosed technology.

BRIEF DESCRIPTION OF THE DRAWINGS

In accompanying drawings (may be not drawn in scale), similar reference numerals may describe similar parts in different views. Similar reference numerals having different letter suffixes may denote different examples of similar parts. The accompanying drawings roughly show various embodiments discussed herein by way of examples instead of restriction manners.

DETAILED DESCRIPTION

It is to be noted that the embodiments of this application and the features in the embodiments may be arbitrarily combined with each other in the case of no conflict.

Figure 1:
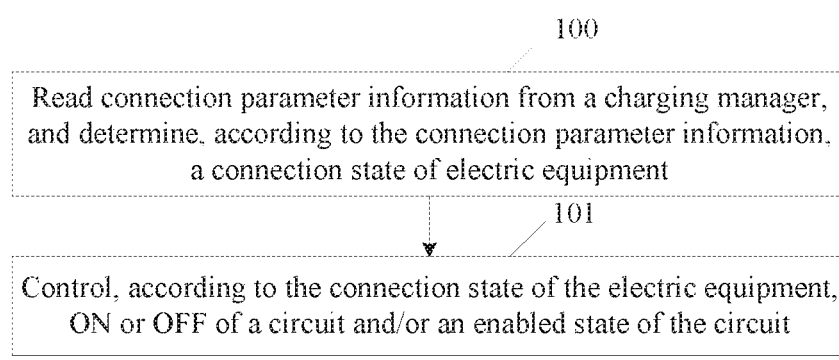
FIG. 1 is a flowchart illustrating a method for implementing connection control according to an embodiment of the present disclosure.

FIG. 1 is a flowchart illustrating a method for implementing connection control according to an embodiment of the present disclosure. As shown in FIG. 1, the method includes following steps.

In Step 100, connection parameter information is read from a charging manager, and a connection state of electric equipment is determined according to the connection parameter information.

In this step, the connection parameter information includes one or more of following parameters:

a wireless charging state parameter (CHG), a power line (VBUS) ON state, an external power input pin voltage value, and an identity number (ID) detection parameter for determining whether there is an On-The-Go (OTG) equipment connection. Herein, the CHG is used for determining whether the wireless charging parameter is available for a wireless terminal.

The determining, according to the connection parameter information, a connection state of electric equipment includes:

determining the electric equipment as a wireless charging state when the wireless charging state parameter CHG is a high level; or determining the electric equipment as a wired charging state when the power line VBUS ON state is ON and the external power input pin voltage value is greater than a preset voltage value; or determining the electric equipment as a USB-connecting computer state when the power line VBUS ON state is ON and the external power input pin voltage value is smaller than the preset voltage value; or determining the electric equipment as a connection OTG equipment state when the ID detection parameter determines there is OTG equipment; or determining the electric equipment as a USB-connecting computer and wireless charging disenabled state when the wireless charging state parameter CHG is the high level, the power line VBUS ON state is ON and the external power input pin voltage value is smaller than the preset voltage value; herein the preset voltage value is 3.6V according to the current USB-connecting computer parameter; or determining the electric equipment as a connection OTG equipment and wireless charging disenabled state when the wireless charging state parameter CHG is a high level and the ID detection parameter determines there is OTG equipment; or determining the electric equipment as an idle state when the wireless charging state parameter CHG is a low level, the power line VBUS state is OFF and the ID detection parameter determines no OTG equipment is connected.

In Step 101, the switching control of connection is implemented by controlling, according to the connection state of the electric equipment, ON or OFF of a circuit and/or an enabled state of the circuit.

When the electric equipment is in the wireless charging state, a data line anode is disconnected from a data line cathode of the electric equipment, and connection between the data line anode and the data line cathode is turned on; or when the electric equipment is in the wired charging state, the connection of the data line anode and the data line cathode of the electric equipment is turned on, the data line anode is disconnected from the data line cathode, and a circuit controlling external power input is turned on; or when the electric equipment is in the USB-connecting computer state, the connection of the data line anode and the data line cathode of the electric equipment is turned on, the data line anode is disconnected from the data line cathode, and the circuit controlling external power input is turned on; or when the electric equipment is in the connection OTG equipment state, the connection of the data line anode and the data line cathode of the electric equipment is turned on, the data line anode is disconnected from the data line cathode, and the circuit controlling external power input is turned on; or when the electric equipment is in the USB-connecting computer and wireless charging disenabled state, the connection of the data line anode and the data line cathode of the electric equipment is turned on, the data line anode is disconnected from the data line cathode, the circuit controlling external power input is turned on, and a wireless charging disenabled signal is transmitted so that the wireless charging is disenabled; or when the electric equipment is in the connection OTG equipment and wireless charging disenabled state, the connection of the data line anode and the data line cathode of the electric equipment is turned on, the data line anode is disconnected from the data line cathode, the circuit controlling external power input is turned on, and a wireless charging disenabled signal is transmitted so that the wireless charging is disenabled; or when the electric equipment is in the idle state, the data line anode is disconnected from the data line cathode of the electric equipment, and the connection between the data line anode and the data line cathode is turned on.

Alternatively, ON or OFF of the circuit may be implemented by means of one or more analog switches.

Figure 2:
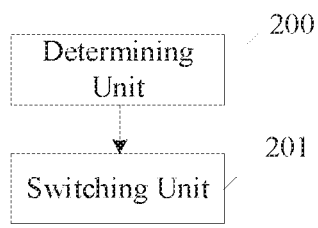
FIG. 2 is a block diagram illustrating a device for implementing connection control according to an embodiment of the present disclosure.

FIG. 2 is a block diagram illustrating a device for implementing connection control according to an embodiment of the present disclosure. As shown in FIG. 2, the device includes a determining unit 200 and a switching unit 201.

The determining unit 200 is configured to read connection parameter information from a charging manager, and determine, according to the connection parameter information, a connection state of electric equipment.

The switching unit 201 is configured to control, according to the connection state of the electric equipment, ON or OFF of a circuit and/or an enabled state of the circuit.

In an alternative embodiment, the connection parameter information includes one or more of following parameters: a wireless charging state parameter CHG, a power line VBUS ON state, an external power input pin voltage value, and an ID detection parameter for determining whether there is an On-The-Go (OTG) equipment connection.

The determining, by the determining unit 200 according to the connection parameter information, a connection state of electric equipment includes:

the determining unit 200 determines the electric equipment as a wireless charging state when the wireless charging state parameter CHG is a high level; or the determining unit 200 determines the electric equipment as a wired charging state when the power line VBUS ON state is ON and the external power input pin voltage value is greater than a preset voltage value; or the determining unit 200 determines the electric equipment as a USB-connecting computer state when the power line VBUS ON state is ON and the external power input pin voltage value is smaller than the preset voltage value; or the determining unit 200 determines the electric equipment as a connection OTG equipment state when the ID detection parameter determines there is OTG equipment; or the determining unit 200 determines the electric equipment as a USB-connecting computer and wireless charging disenabled state when the wireless charging state parameter CHG is the high level, the power line VBUS ON state is ON and the external power input pin voltage value is smaller than the preset voltage value; or the determining unit 200 determines the electric equipment as a connection OTG equipment and wireless charging disenabled state when the wireless charging state parameter CHG is a high level and the ID detection parameter determines there is OTG equipment; or the determining unit 200 determines the electric equipment as an idle state when the wireless charging state parameter CHG is a low level, the power line VBUS state is OFF and the ID detection parameter determines no OTG equipment is connected.

In an alternative embodiment, the switching unit 201 is configured to:

disconnect a data line anode from a data line cathode of the electric equipment and turn on connection between the data line anode and the data line cathode when the electric equipment is in the wireless charging state; or turn on the connection between the data line anode and the data line cathode of the electric equipment, disconnect the data line anode from the data line cathode, and turn on a circuit controlling external power input when the electric equipment is in the wired charging state; or turn on the connection between the data line anode and the data line cathode of the electric equipment, disconnect the data line anode from the data line cathode, and turn on the circuit controlling external power input when the electric equipment is in the USB-connecting computer state; or turn on the connection between the data line anode and the data line cathode of the electric equipment, disconnect the data line anode from the data line cathode, and turn on the circuit controlling external power input when the electric equipment is in the connection OTG equipment state; or turn on the connection between the data line anode and the data line cathode of the electric equipment, disconnect the data line anode from the data line cathode, turn on the circuit controlling external power input, and transmit a wireless charging disenabled signal so that the wireless charging is disenabled when the electric equipment is in the USB-connecting computer and wireless charging disenabled state; or turn on connection between the data line anode and the data line cathode of the electric equipment, disconnect the data line anode from the data line cathode, turn on the circuit controlling external power input, and transmit a wireless charging disenabled signal so that the wireless charging is disenabled when the electric equipment is in the connection OTG equipment and wireless charging disenabled state; or disconnect the data line anode from the data line cathode of the electric equipment and turn on the connection between the data line anode and the data line cathode when the electric equipment is in the idle state.

In an alternative embodiment, the switching unit 201 is configured to implement OFF or ON of the circuit by means of one or more analog switches according to the connection state of the electric equipment, and/or implement the enabled state of the circuit by means of an enable signal so as to implement switching control of connection.

In an alternative embodiment, the device according to the embodiment of the present disclosure further includes a baseband chip unit, which is configured to control the analog switches and/or transmit a wireless charging enable or disenable signal according to a signal of the switching unit.

Application Example

Figure 3:
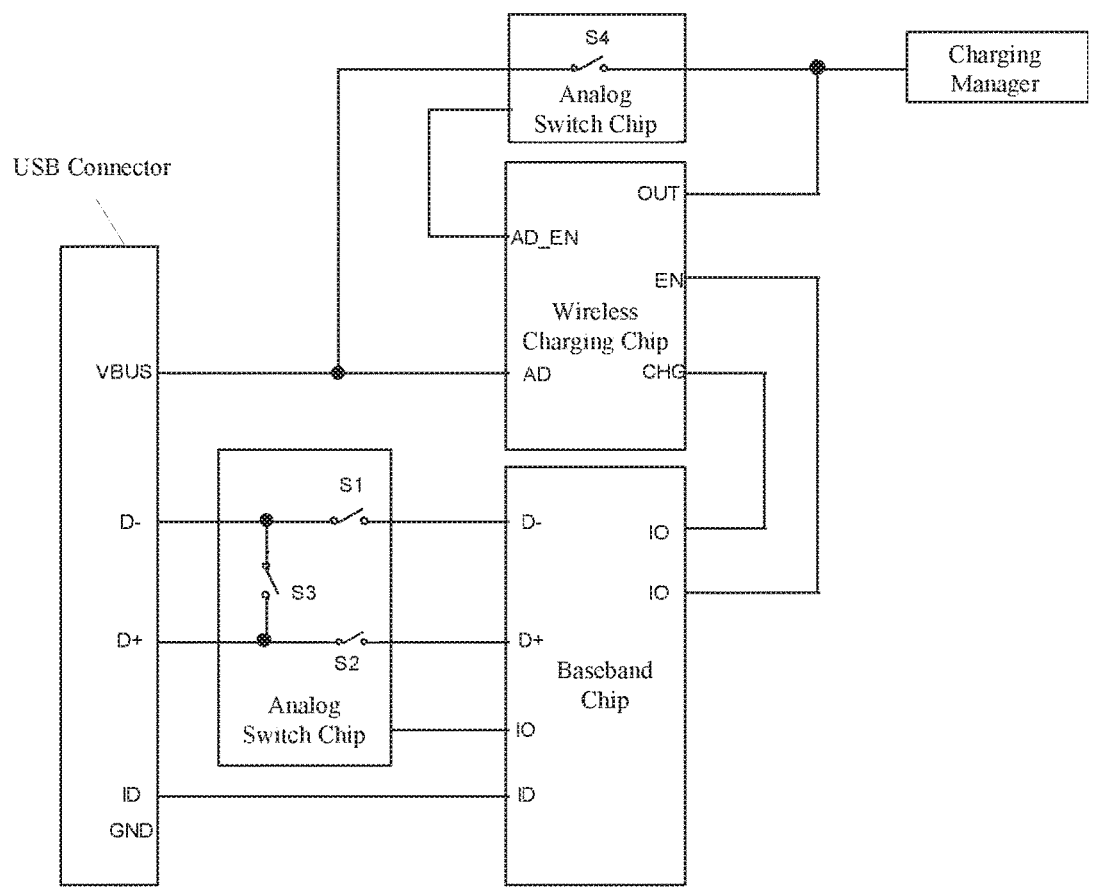
FIG. 3 is a flowchart illustrating a method according to an application example of the present disclosure.

FIG. 3 is a circuit connection diagram of electric equipment according to an application example. As shown in FIG. 3, S1, S2, S3 and S4 represent analog switches, which are arranged in the circuit in the form of analog switch chips. A wireless charging output is connected to the analog switch S4. The S2 is configured to control ON or OFF of the data line anode of the electric equipment. The S1 is configured to control ON or OFF of the data line cathode of the electric equipment. The S3 is configured to control ON or OFF of a circuit between the data line anode and the data line cathode. The S4 is configured to control ON or OFF of a circuit of an external power input. Switches of the S1, S2, S3 and S4 are controlled by baseband signal. The wireless charging enable is controlled by an enable signal transmitted by the baseband chip.

The connection parameter information read from a USB connector includes: a wireless charging state parameter CHG, a power line VBUS ON state, an external power input pin voltage value, and an ID detection parameter for determining whether there is an On-The-Go (OTG) equipment connection.

The electric equipment is determined as a wireless charging state when the wireless charging state parameter CHG is a high level.

The electric equipment is determined as a wired charging state when the power line VBUS ON state is ON and the external power input pin voltage value is greater than 3.6V.

The electric equipment is determined as a USB-connecting computer state when the power line VBUS ON state is ON and the external power input pin voltage value is smaller than 3.6V.

The electric equipment is determined as a connection OTG equipment state when the ID detection parameter determines there is OTG equipment.

The electric equipment is determined as a USB-connecting computer and wireless charging disenabled state when the wireless charging state parameter CHG is a high level, the power line VBUS is ON and the external power input pin voltage value is smaller than 3.6V.

The electric equipment is determined as a connection OTG equipment and wireless charging disenabled state when the wireless charging state parameter CHG is a high level and the ID detection parameter determines there is OTG equipment.

The electric equipment is determined as an idle state when the wireless charging state parameter CHG is a low level, the power line VBUS is OFF and the ID detection parameter determines no OTG equipment is connected.

When the electric equipment is in the wireless charging state, the S1 and the S2 are turned off, the S3 is turned on, and the S4 is turned off.

When the electric equipment is in the wired charging state, the S1 and the S2 are turned on, the S3 is turned off, and the S4 is turned on.

When the electric equipment is in the USB-connecting computer state, the S1 and the S2 are turned on, the S3 is turned off, and the S4 is turned on.

When the electric equipment is in the connection OTG equipment state, the S1 and the S2 are turned on, the S3 is turned off, and the S4 is turned on.

When the electric equipment is in the USB-connecting computer and wireless charging disenabled state, the S1 and the S2 are turned on, the S3 is turned off, a wireless charging disenabled signal is transmitted so that the wireless charging is disenabled, and the S4 is turned on.

When the electric equipment is in the connection OTG equipment and wireless charging disenabled state, the S1 and the S2 are turned on, the S3 is turned off, the S4 is turned on, and a wireless charging disenabled signal is transmitted so that the wireless charging is disenabled.

When the electric equipment is in the idle state, the S1 and the S2 are turned off, the S3 is turned on, and the S4 is turned off.

Persons of ordinary skill in the art may understand that all or a part of steps in the foregoing method may be implemented by programs instructing the related hardware. The programs may be stored in a computer readable storage medium, such as a red-only memory, a magnetic disc, an optical disc or the like. Alternatively, all or a part of steps in the foregoing embodiments may also be implemented by one or more integrated circuits. Correspondingly, various modules/units in the foregoing embodiments may be implemented in the form of hardware, or be implemented in the form of software function modules. The embodiments of the present disclosure are not limited to combination of hardware and software in any particular form.

What is claimed is:

1. A method for implementing connection control, comprising:

reading connection parameter information from a charging manager, and determining, according to the connection parameter information, a connection state of an electric equipment; and controlling, according to the connection state of the electric equipment, ON or OFF of a circuit and/or an enabled state of the circuit, wherein the controlling, according to the connection state of the electric equipment, ON or OFF of a circuit and/or an enabled state of the circuit comprises at least one of:

disconnecting a data line anode from a data line cathode of the electric equipment and turning on connection between the data line anode and the data line cathode when the electric equipment is in the wireless charging state;

turning on connection of the data line anode and the data line cathode of the electric equipment, disconnecting the data line anode from the data line cathode, and turning on a circuit controlling external power input when the electric equipment is in the wired charging state;

turning on connection of the data line anode and the data line cathode of the electric equipment, disconnecting the data line anode from the data line cathode, and turning on the circuit controlling external power input when the electric equipment is in the USB-connecting computer state;

turning on connection of the data line anode and the data line cathode of the electric equipment, disconnecting the data line anode from the data line cathode, and turning on the circuit controlling external power input when the electric equipment is in the connection OTG equipment state;

turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the USB-connecting computer and wireless charging disenabled state;

turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the connection OTG equipment and wireless charging disenabled state; and disconnecting the data line anode from the data line cathode of the electric equipment and turning on connection between the data line anode and the data line cathode when the electric equipment is in the idle state.

2. The method according to claim 1, wherein the connection parameter information comprises one or more of following parameters:

a wireless charging state parameter CHG, a power line VBUS ON state, an external power input pin voltage value, and an identity number ID detection parameter for determining whether there is an On-The-Go (OTG) equipment connection.

3. The method according to claim 2, wherein the determining, according to the connection parameter information, a connection state of electric equipment comprises at least one of the following steps:

determining the electric equipment as a wireless charging state when the wireless charging state parameter CHG is a high level;

determining the electric equipment as a wired charging state when the power line VBUS ON state is ON and the external power input pin voltage value is greater than a preset voltage value;

determining the electric equipment as a USB-connecting computer state when the power line VBUS ON state is ON and the external power input pin voltage value is smaller than the preset voltage value;

determining the electric equipment as a connection OTG equipment state when the ID detection parameter determines there is OTG equipment;

determining the electric equipment as a USB-connecting computer and wireless charging disenabled state when the wireless charging state parameter CHG is the high level, the power line VBUS ON state is ON and the external power input pin voltage value is smaller than the preset voltage value;

determining the electric equipment as a connection OTG equipment and wireless charging disenabled state when the wireless charging state parameter CHG is a high level and the ID detection parameter determines there is OTG equipment; and determining the electric equipment as an idle state when the wireless charging state parameter CHG is a low level, the power line VBUS state is OFF and the ID detection parameter determines no OTG equipment is connected.

4. The method according to claim 1, wherein ON or OFF of the circuit is implemented by means of one or more analog switches.

5. A terminal, comprising:
a processor; and
a memory configured to store instructions executable by the processor;
wherein the processor is configured to perform:
reading connection parameter information from a charging manager, and determining, according to the connection parameter information, a connection state of an electric equipment; and
controlling, according to the connection state of the electric equipment, ON or OFF of a circuit and/or an enabled state of the circuit,
wherein the processor configured to perform controlling, according to the connection state of the electric equipment, ON or OFF of a circuit and/or an enabled state of the circuit is configured to perform at least one of:
disconnecting a data line anode from a data line cathode of the electric equipment and turning on connection between the data line anode and the data line cathode when the electric equipment is in the wireless charging state;
turning on connection of the data line anode and the data line cathode of the electric equipment, disconnecting the data line anode from the data line cathode, and turning on a circuit controlling external power input when the electric equipment is in the wired charging state;
turning on connection of the data line anode and the data line cathode of the electric equipment, disconnecting the data line anode from the data line cathode, and turning on the circuit controlling external power input when the electric equipment is in the USB-connecting computer state;
turning on connection of the data line anode and the data line cathode of the electric equipment, disconnecting the data line anode from the data line cathode, and turning on the circuit controlling external power input when the electric equipment is in the connection OTG equipment state;
turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the USB-connecting computer and wireless charging disenabled state;
turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the connection OTG equipment and wireless charging disenabled state; and disconnecting the data line anode from the data line cathode of the electric equipment and turning on connection between the data line anode and the data line cathode when the electric equipment is in the idle state.

6. The terminal according to claim 5, wherein the connection parameter information comprises one or more of following parameters:
a wireless charging state parameter CHG, a power line VBUS ON state, an external power input pin voltage value, and an identity number ID detection parameter for determining whether there is an On-The-Go (OTG) equipment connection.

7. The terminal according to claim 6, wherein the processor configured to perform determining, according to the connection parameter information, a connection state of electric equipment is configured to perform at least one of following steps:
determining the electric equipment as a wireless charging state when the wireless charging state parameter CHG is a high level;
determining the electric equipment as a wired charging state when the power line VBUS ON state is ON and the external power input pin voltage value is greater than a preset voltage value;
determining the electric equipment as a USB-connecting computer state when the power line VBUS ON state is ON and the external power input pin voltage value is smaller than the preset voltage value;
determining the electric equipment as a connection OTG equipment state when the ID detection parameter determines there is OTG equipment;
determining the electric equipment as a USB-connecting computer and wireless charging disenabled state when the wireless charging state parameter CHG is the high level, the power line VBUS ON state is ON and the external power input pin voltage value is smaller than the preset voltage value;
determining the electric equipment as a connection OTG equipment and wireless charging disenabled state when the wireless charging state parameter CHG is a high level and the ID detection parameter determines there is OTG equipment; and
determining the electric equipment as an idle state when the wireless charging state parameter CHG is a low level, the power line VBUS state is OFF and the ID detection parameter determines no OTG equipment is connected.

8. A non-transitory computer-readable storage medium having stored therein instructions that, when executed by a processor of a terminal, causes the terminal to perform a method for implementing connection control, the method comprising:
reading connection parameter information from a charging manager, and determining, according to the connection parameter information, a connection state of an electric equipment; and
controlling, according to the connection state of the electric equipment, ON or OFF of a circuit and/or an enabled state of the circuit,
wherein the controlling, according to the connection state of the electric equipment, ON or OFF of a circuit and/or an enabled state of the circuit comprises at least one of:

disconnecting a data line anode from a data line cathode of the electric equipment and turning on connection between the data line anode and the data line cathode when the electric equipment is in the wireless charging state;

turning on connection of the data line anode and the data line cathode of the electric equipment, disconnecting the data line anode from the data line cathode, and turning on a circuit controlling external power input when the electric equipment is in the wired charging state;

turning on connection of the data line anode and the data line cathode of the electric equipment, disconnecting the data line anode from the data line cathode, and turning on the circuit controlling external power input when the electric equipment is in the USB-connecting computer state;

turning on connection of the data line anode and the data line cathode of the electric equipment, disconnecting the data line anode from the data line cathode, and turning on the circuit controlling external power input when the electric equipment is in the connection OTG equipment state;

turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the USB-connecting computer and wireless charging disenabled state;

turning on connection of the data line anode and the data line cathode of the electric equipment, disconnecting the data line anode from the data line cathode, turning on the circuit controlling external power input, and transmitting a wireless charging disenabled signal so that the wireless charging is disenabled when the electric equipment is in the connection OTG equipment and wireless charging disenabled state; and disconnecting the data line anode from the data line cathode of the electric equipment and turning on connection between the data line anode and the data line cathode when the electric equipment is in the idle state.

* * * * *